US006542487B1

(12) United States Patent
Ishii et al.

(10) Patent No.: US 6,542,487 B1
(45) Date of Patent: Apr. 1, 2003

(54) RADIO CHANNEL MULTIPLEX COMMUNICATION METHOD, A MOBILE UNIT, AND A BASE STATION IN CDMA MOBILE COMMUNICATION SYSTEM

(75) Inventors: Nobuaki Ishii, Tokyo (JP); Gen Motoyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/458,656

(22) Filed: Dec. 10, 1999

(30) Foreign Application Priority Data

Dec. 11, 1998 (JP) .......................... 10-352313

(51) Int. Cl.[7] .................. H04B 7/216; H04B 7/00; H04J 3/06
(52) U.S. Cl. .................. 370/335; 370/503; 455/502
(58) Field of Search .................. 370/328, 329, 370/335, 336, 337, 342, 345, 347, 350, 503–520; 455/502

(56) References Cited

U.S. PATENT DOCUMENTS 4,763,322 A * 8/1988 Eizenhofer ................ 370/337
5,355,368 A * 10/1994 Dore et al. ................ 370/296
5,519,710 A * 5/1996 Otsuka ...................... 370/337
6,016,322 A * 1/2000 Goldman ................... 370/337

FOREIGN PATENT DOCUMENTS

| JP | 06-204943 | 7/1994 |
| JP | 6-237214 | 8/1994 |
| JP | 6-318927 | 11/1994 |
| JP | 9-252490 | 9/1997 |
| JP | 9-261716 | 10/1997 |
| JP | 9-327073 | 12/1997 |
| JP | 10-224316 | 8/1998 |
| JP | 10-242937 | 9/1998 |

* cited by examiner

Primary Examiner—Tracy Legree
(74) Attorney, Agent, or Firm—Sughrue Mion, PLLC

(57) ABSTRACT

In a code division multiple access mobile communication system, a communication signal is modulated and multiplexed with different diffusion codes and is used in data communication between a base station (30) and each of mobile units (40, 41, 42). The communication signal is a time division multiplex signal with a repeated frame having a plurality of time slots (TS0, TS1, TS2) assigned to different radio channels, respectively. A slot synchronous signal is produced in accordance with a reference clock signal of a global positioning system. The time slots are synchronized between the base station and each of the mobile units in accordance with the slot synchronous signal.

8 Claims, 10 Drawing Sheets

PREVIOUS TECHNIQUE

TRANSMISSION TIMING

FIG. 9A

| TS2 | TS0 | TS1 | TS2 | TS0 | TS1 | TS2 | TS0 |

SHORT-DISTANCE RECEPTION TIMING

FIG. 9B

| TS2 | TS0 | TS1 | TS2 | TS0 | TS1 | TS2 | TS0 |

MEDIUM-DISTANCE RECEPTION TIMING

FIG. 9C

| TS2 | TS0 | TS1 | TS2 | TS0 | TS1 | TS2 | TS0 |

LONG-DISTANCE RECEPTION TIMING

FIG. 9D

| TS2 | TS0 | TS1 | TS2 | TS0 | TS1 | TS2 | TS0 |

RADIO CHANNEL MULTIPLEX COMMUNICATION METHOD, A MOBILE UNIT, AND A BASE STATION IN CDMA MOBILE COMMUNICATION SYSTEM

BACKGROUND OF THE INVENTION

The present invention relates to a code division multiple access (CDMA) mobile communication system and, more particularly, to a radio channel multiplex communication method, a mobile unit, and a base station which are for use in the CDMA mobile communication system.

A mobile communication system is well known which comprises a base station control device connected to a mobile communication switching unit via a wire channel, a plurality of base stations connected to the base station control device via wire channels, and a plurality of mobile units located in a service area of each base station connected to the base station via a radio channel.

Moreover, as a method of multiplexing the radio channel between each base station and the plurality of mobile units to obtain multiple channels, together with frequency division multiple access (FDMA) and time division multiple access (TDMA), code division multiple access (CDMA) is known in which information bits to be communicated are subjected to spectrum diffusion and multiplexed in the same carrier wave by a diffusion code pattern formed of several tens to several thousands of bits.

The CDMA mobile communication system has advantages in that it is strong against a narrow bandwidth disturbance and that a multiplicity of radio channels can be accommodated in the same carrier wave.

In the CDMA mobile communication system, the number of radio channels is determined in the service area by the number of diffusion codes in the CDMA mobile communication system. The number of diffusion codes, which can be used, is limited and limits the number of radio channels which can simultaneously be secured. Therefore, when the traffic amount is large, there are a multiplicity of mobile units which cannot simultaneously communicate.

Particularly in the CDMA mobile communication system, since a method of connecting a plurality of radio channels to one mobile unit is employed in order to prevent communication quality from being deteriorated, there are a multiplicity of mobile units which cannot simultaneously communicate. To prevent this problem, for example, a method of multiplexing frequency to increase the resources of radio channels is proposed, but this method has a problem that the equipment is enlarged, and other problems.

Additionally, a technique of further time-division multiplexing a CDMA signal is disclosed, for example, in Japanese Patent Application Laid-Open No. 252490/1997 titled "Radio Base Station" (hereinafter referred to as the first prior art), Japanese Patent Application Laid-Open No. 327073/1997 titled "Pilot Channel Arrangement and Transmission Method in CDMA Mobile Communication System" (hereinafter referred to as the second prior art), Japanese Patent Application Laid-Open No. 318927/1994 titled "Communication Method and System" (hereinafter referred to as the third prior art), Japanese PatentApplication Laid-Open No. 237214/1994 titled "Mobile Communication System", and the like.

For example, in the first prior art, for the purpose of the time division multiple access of a channel to enhance the use efficiency of the channel, a radio base station comprises spectrum diffusion modulating means for performing spectrum diffusion/modulation based on a diffusion code selected by control means, time division multiplexing means for time-division multiplexing the signal modulated by the spectrum diffusion modulating means to dispose the signal in a time slot, and transmitting means for transmitting the time-division multiplexed and disposed signal.

Moreover, in the second prior art, an object is to provide a pilot channel arrangement and transmission method in CDMA mobile communication system, in which a descending radio channel is time-division multiplexed, the pilot channel is efficiently assigned, and the interference power of the pilot channel to other cells can be reduced. There is provided a pilot channel arrangement and transmission method in which a plurality of cells are connected to base stations, the base stations are modulated with the same frequency, the pilot channels diffused with different assigned diffusion codes are transmitted, and a mobile station judges a cell located in an area by receiving the pilot channel. The method comprises the steps of time dividing a descending radio channel leading toward the mobile station from the base station into a plurality of time slots to perform the time division multiplexing, and assigning one of the plurality of time slots as the pilot channel.

Furthermore, in the third prior art, an object is to provide a communication method and system in which the number of users in one network or cell can be increased. Data is transmitted using CDMA/TDMA or TDMA/CDMA combination for multiplex use, and a complementary code set (completely orthogonal codes or mutually non-acting codes) is used as a spreading code.

To apply this method to the existing or planned TDMA system, CDMA section is added to the system. Moreover, to increase the number of users, diffusion coding CDMA multi-access can be utilized in all time slots of TDMA frame in the above-described system.

Therefore, any power control method or multi-access interference cancel method becomes unnecessary.

Moreover, in the fourth prior art, an object is to provide a mobile communication system which has a large capacity, which is strong against narrow bandwidth disturbance, and which can change the data rate. When the spectrum diffusion system is used in the radio communication system, and a plurality of data strings are sent on the same carrier wave by changing a diffusion code pattern by a diffusion circuit, the data string of the same diffusion code pattern is time-division multiplexed in a burst generating circuit and a parallel/serial converting circuit, and the communication channels are assigned to the slots. In this case, by providing the data string with a spare time slot to avoid the disturbance, the advantage that the system is strong against the narrow bandwidth disturbance of the spectrum diffusion system, and the advantage that the data rate of time division multiplex system can be varied can both be utilized. More communication channels can be secured with less diffusion code patterns as compared with the prior art, and the deterioration of a desired wave reception level by other diffusion codes in the same carrier wave can be suppressed.

As described above, there have been proposed various techniques of increasing the radio channels with the signals obtained by further time-division multiplexing the CDMA signals. When the technique is used in the mobile communication system, particularly the synchronization of the time slots on the transmission and reception sides is a problem.

When the time division multiplex signal is used, needless to say, it is important to accurately obtain the synchronization of the time slots on the transmission and reception sides. However, the conventional mobile unit or base station is not constituted to obtain accurate time information by itself. For example, the time information obtained by the base station control device is received with a control signal as occasion demands. Therefore, it is difficult to obtain accurate synchronization of the time slots on the transmission and reception sides. As described later, a guard timing for absorbing synchronization deviation has to be set to be large, which deteriorates the communication efficiency.

SUMMARY OF THE INVENTION

It is therefore an object of the present invention to provide a CDMA mobile communication system, in which more radio channels can be secured without increasing the frequency for use.

It is another object of the present invention to provide a CDMA mobile communication system of the type described, in which synchronization deviation is suppressed.

It is still another object of the present invention to provide a CDMA mobile communication system of the type described, in which guard timing can be reduced.

It is yet another object of the present invention to provide a mobile unit which is suitable for use in the CDMA mobile communication system.

It is a further object of the present invention to provide a base station which is suitable for use in the CDMA mobile communication system.

Other objects of the present invention will become clear as the description proceeds.

According to the present invention, there is provided a radio channel multiplex communication method for a code division multiple access mobile communication system including a bas station and a plurality of mobile units and using a communication signal, modulated and multiplexed with different diffusion codes, in data communication between the base station and each of the mobile units. The radio channel multiplex communication method comprises the steps of producing, as the communication signal, a time division multiplex signal with a repeated frame having a plurality of time slots, assigning the time slots to different radio channels, respectively, obtaining a reference clock signal of a global positioning system, producing a slot synchronous signal in accordance with the reference clock signal, and synchronizing the time slots between the base station and each of the mobile units in accordance with the slot synchronous signal.

It may be arranged that the radio channel multiplex communication method further comprises the steps of obtaining measured position information of the global positioning system processing the measured position information to produce communication distance information representative of a distance between the base station and each of the mobile units, delaying the slot synchronous signal in accordance with the communication distance information to produce a delayed slot synchronous signal, and using the delayed slot synchronous signal to synchronize the time slots used in a reception side of the data communication.

It may be arranged that the repeated frame has an ascending frame and a descending frame, the radio channel multiplex communication method further comprising the step of deviating the ascending and the descending frames to each other by one of the time slots.

It may be arranged that the radio channel multiplex communication method further comprises the step of making the time slots be different from one another in length.

According to the present invention, there is provided a radio channel multiplex communication method for a code division multiple access mobile communication system including a base station and a plurality of mobile units and using a communication signal, modulated and multiplexed with different diffusion codes, in data communication between the base station and each of the mobile units. The radio channel multiplex communication method comprises the steps of producing, as the communication signal, a time division multiplex signal with a repeated frame having a plurality of time slots, assigning the time slots to different radio channels, respectively, obtaining a reference clock signal of a global positioning system, producing a slot synchronous signal in accordance with the reference clock signal, and synchronizing the time slots between the base station and each of the mobile units in accordance with the slot synchronous signal.

It may be arranged that the GPS receiver further receives measured position information of the global positioning system, the base station further comprising information processing means connected to the GPS receiver for processing the measured position information to produce communication distance information representative of a distance between each of the mobile units and the base station and delaying means connected to the information processing means and the synchronizing means for delaying the slot synchronous signal in accordance with the communication distance information to produce a delayed slot synchronous signal, the synchronizing means synchronizing the time slots in accordance with the delayed slot synchronous signal at a reception side of the base station.

According to the present invention, there is provided a base station for use in a code division multiple access mobile communication system including a plurality of mobile units and using a communication signal, modulated and multiplexed with different diffusion codes, in data communication between the base station and each of the mobile units, the communication signal being a time division multiplex signal with a repeated frame having a plurality of time slots which are assigned to different radio channels, respectively. The base station comprises a GPS receiver for receiving a reference clock signal of a global positioning system, clock processing means connected to the GPS receiver for processing the reference clock signal into a slot synchronous signal, and synchronizing means connected to the clock processing means for synchronizing the time slots between each of the mobile units and the base station in accordance with the slot synchronous signal.

It may be arranged that the GPS receiver further receives measured position information of the global positioning system, the base station further comprising information processing means connected to the GPS receiver for processing the measured position information to produce communication distance information representative of a distance between each of the mobile units and the base station and delaying means connected to the information processing means and the synchronizing means for delaying the slot synchronous signal in accordance with the communication distance information to produce a delayed slot synchronous signal, the synchronizing means synchronizing the time slots in accordance with the delayed slot synchronous signal at a reception side of the bas station.

BRIEF DESCRIPTION OF THE DRAWINGS

FIGS. 9A through 9D are explanatory views for describing an operation of the CDMA mobile communication system according to the second embodiment.

DESCRIPTION OF THE PREFERRED EMBODIMENTS

Figure 1:
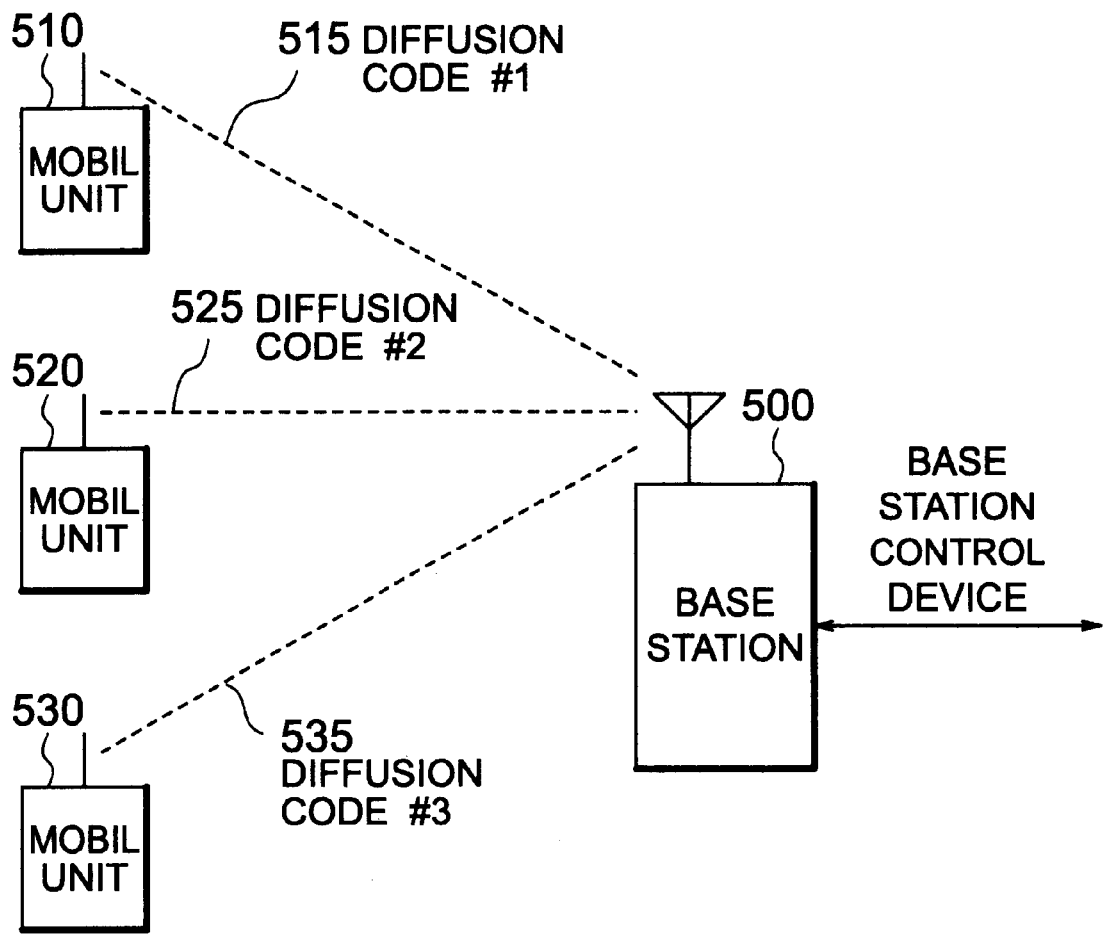
FIG. 1 is a block diagram of a CDMA mobile communication system in previous technique.

With reference to FIG. 1, description will be made at first as regards a CDMA mobile communication system in previous technique for better understanding of the present invention.

The CDMA mobile communication system comprises a base station 500 and a plurality of mobile units 510, 520, and 530 located in the service area of the base station 500. For the assignment of radio channels to the mobile units in the CDMA system, when the mobile units 510, 520, and 530 simultaneously perform communication, different radio channels are assigned using different diffusion codes. Specifically, a radio channel 515 with a diffusion code #1 is assigned to the mobile unit 510, a radio channel 525 with a diffusion code #2 is assigned to the mobile unit 520, and a radio channel 535 with a diffusion code #3 is assigned to the mobile unit 530.

In the conventional CDMA mobile communication system of FIG. 1, the number of radio channels is determined in the service area by the number of diffusion codes. The number of diffusion codes, which can be used, is limited and limits the number of radio channels which can simultaneously be secured. Therefore, when the traffic amount is large, there are a multiplicity of mobile units which cannot simultaneously communicate.

With reference to FIGS. 2–5, 6A, and 6B, the description will be directed to a CDMA mobile communication system according to a first embodiment of the present invention. In the CDMA mobile communication system, use is made of a radio channel multiplex communication method which will become clear as the description proceeds.

Figure 2:
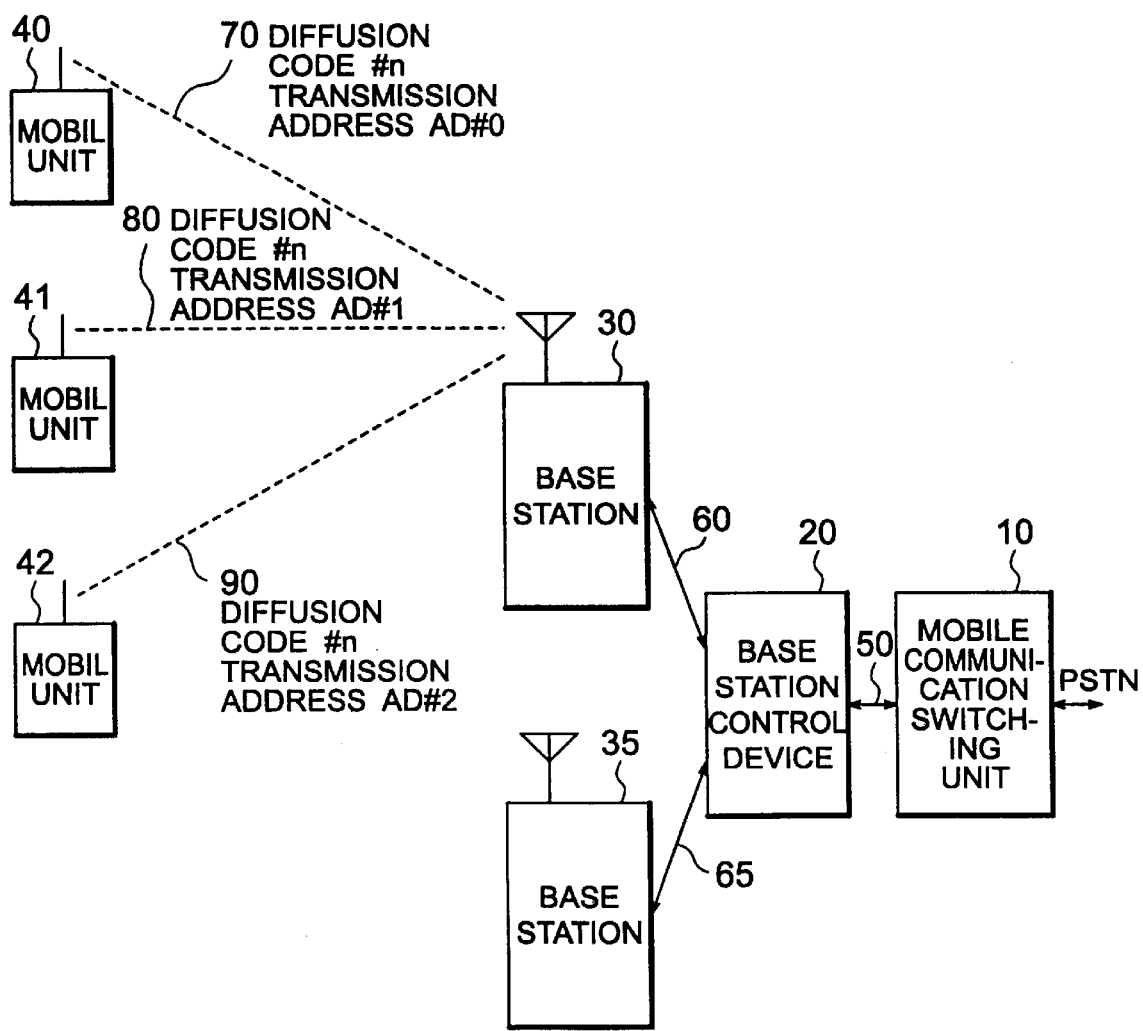
FIG. 2 is a block diagram of a CDMA mobile communication system according to a first embodiment of the present invention.

Referring to FIG. 2, the CDMA mobile communication system includes a mobile communication switching unit 10, a base station control device 20, a plurality of base stations 30 and 35, and a plurality of mobile units 40, 41, and 42 located in the service area of the base station 30.

In the manner which will later become clear, the CDMA mobile communication system uses a communication signal, modulated and multiplexed with different diffusion codes, in data communication between each of the base stations 30 and 50 and each of the mobile units 40, 41, and 42. The communication signal is a time division multiplex signal with a repeated frame having a plurality of time slots which are assigned to different radio channels, respectively.

The mobile communication switching unit 10 is connected between a public network (PSTN) and the base station control device 20 via a communication channel (wire) 50. The mobile communication switching unit 10 has an interface function for a call processing of a mobile network and a fixed network or the public network. The base station control device 20 is connected to the base stations 30 and 35 via communication channels (wires) 60 and 65, respectively, and performs the call processing with the mobile units. The base station 30 is connected to the mobile units 40, 41, and 42 via separate radio channels 70, 80, and 90, respectively, to perform transmission/reception of communication data. Additionally, the radio channels 70, 80, and 90 are connected to the different mobile units 40, 41, and 42 by time division multiplexing using the same frequency and the same diffusion code, that is, by using a time division multiplex signal with a repeated frame formed of different time slots for each mobile unit.

Figure 3:
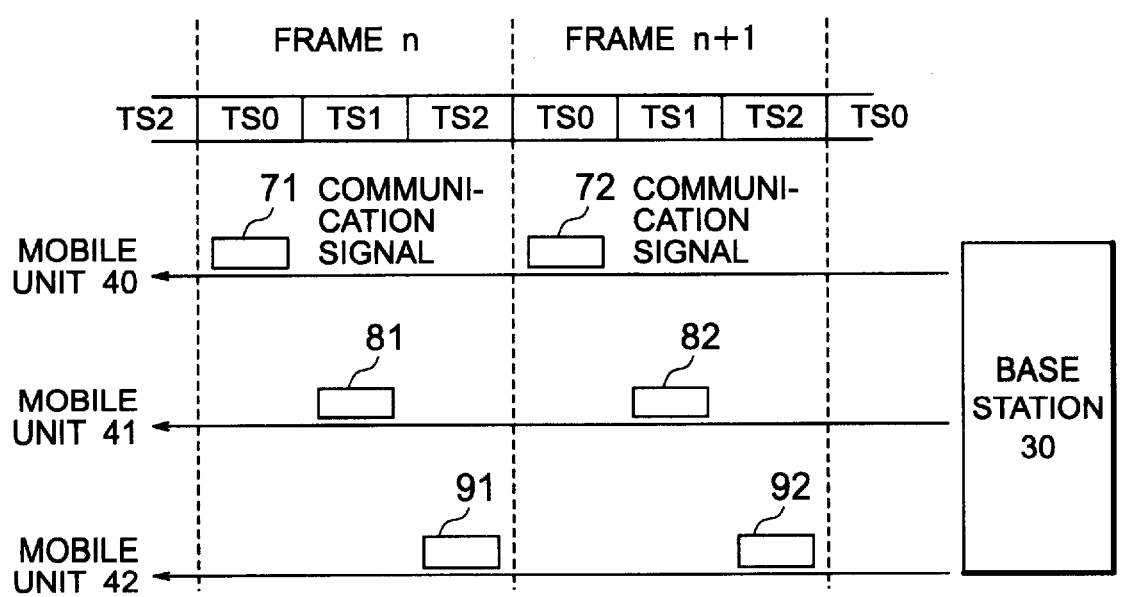
FIG. 3 is an explanatory view of a time division multiplex signal for use in the CDMA mobile communication system of FIG. 2.

Referring to FIG. 3, the description will be made as regards a time division multiplex signal used in the CDMA mobile communication system.

The time division multiplex signal has a frame signal or the repeated frame repeatedly transmitted towards each of the radio channels 70, 80, and 90. The repeated frame has, for example, three time slots TS0, TS1, and TS2. Communication signals 71 and 72 to the mobile unit 40 (or from the mobile unit 40) use the time slot TS0. Communication signals 81 and 82 to the mobile unit 41 (or from the mobile unit 41) use the time slot TS1. Communication signals 91 and 92 to the mobile unit 42 (or from the mobile unit 42) use the time slot TS2. Thus, the different mobile units 40, 41, and 42 are accommodated using the same frequency and the same diffusion code and using the separate radio channels 70, 80, and 90.

Figure 4:
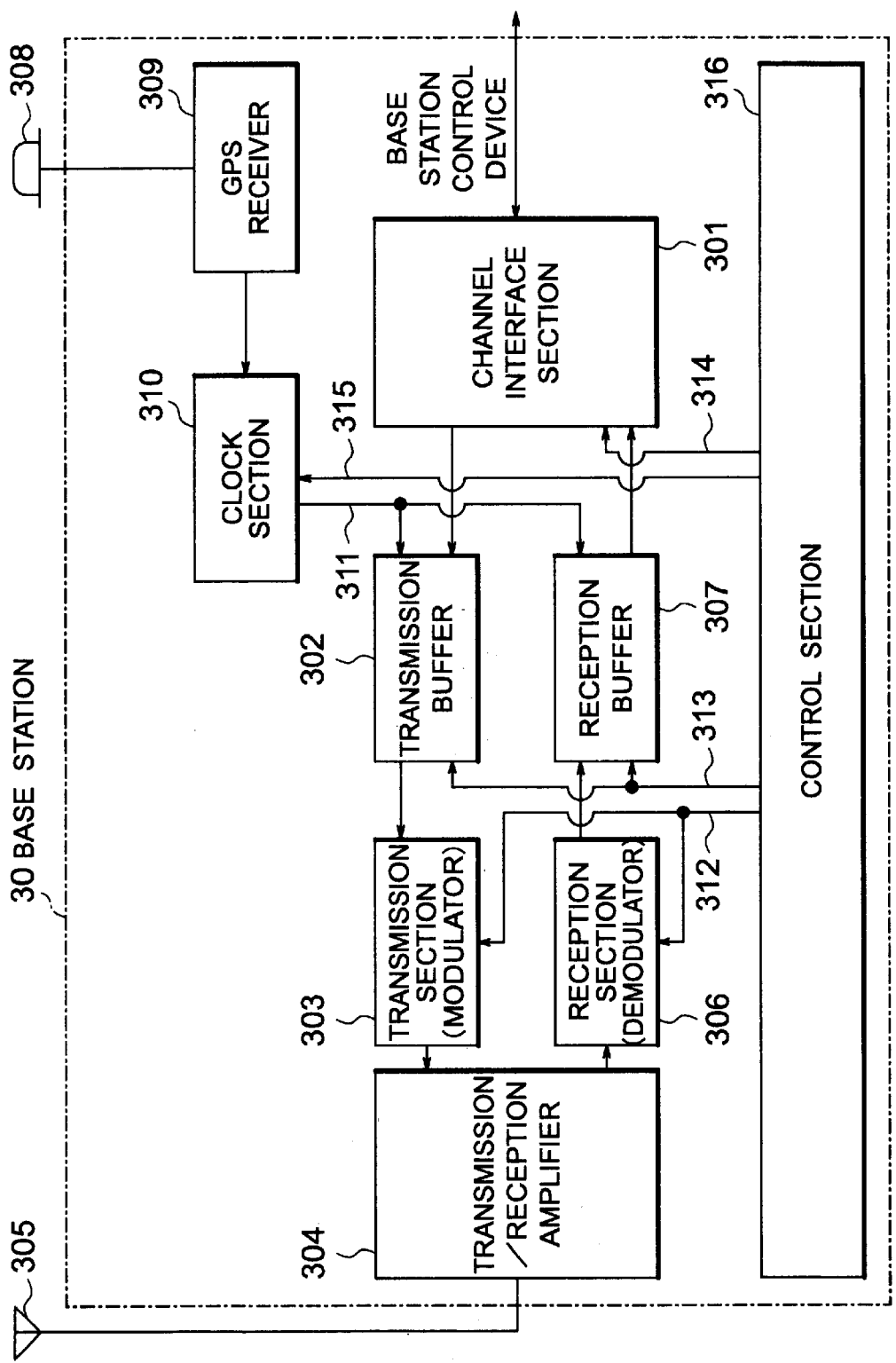
FIG. 4 is a block diagram of a base station for use in the CDMA mobile communication system of FIG. 2.

Referring to FIG. 4 together with FIG. 2, the description will be made as regards the base station 30 included in the CDMA mobile communication system of FIG. 2.

The base station 30 comprises a channel interface section 301, a transmission buffer 302, a transmission section 303, a transmission/reception amplifier 304, a communication antenna 305, a reception section 306, a reception buffer 307, a GPS antenna 308, a GPS receiver 309, a clock section 310, a control section 316, and control signal conductors 312, 313, 314, and 315.

The channel interface section 301 is connected to the base station control device 20 via the communication channel 60 (65) and is for performing data communication with the base station control device 20. Namely, the channel interface section 301 transmits data signals for the mobile units 40, 41, and 42, received from the base station control device 20, to the transmission buffer 302 via a transmission/communication channel. Additionally, call control known in the art is performed via the control signal conductor 314.

In the transmission buffer 302, the inputted data are separated and assigned to the time slots in accordance with a slot synchronous signal 311 transmitted from the clock section 310, and sent to the transmission section 303. Additionally, the clock section 310 receives a control signal 315, supplied from the control section 316, to produce a slot synchronous signal 311 from a reference clock signal which will later be described. In other words, the clock section 310 processes the reference clock signal into the slot synchronous signal 311 under control of the control signal 315. Therefore, the clock section 310 is referred to as a clock processing arrangement. Moreover, the time slot number for use is notified via the control signal conductor 313.

In the transmission section 303, the data signal is modulated with predetermined frequency and diffusion code, transmitted to the transmission/reception amplifier 304, and radio-transmitted to the mobile units 40, 41, 42 via the communication antenna 305. Additionally, the frequency and diffusion code to be set are notified to the transmission section 303 and the reception section 306 via the control signal conductor 312.

Moreover, the reception section 306 receives communication data signals from the mobile units 40, 41, 42 via the communication antenna 305 and the transmission/reception amplifier 304, and demodulates and transmits the signals to the reception buffer 307. The reception buffer 307 concentrates reception signals for each corresponding time slot and transmits them to the channel interface section 301. The GPS receiver 309 receives via the GPS antenna 308 the reference clock signal of a global positioning system known in the art and transmits the clock to the clock section 310. The control section 316 is constituted to control the entire base station device. Each of the transmission buffer 302 and the reception buffer 307 is referred to as a synchronizing arrangement for synchronizing the time slots between the base stations 30 and 35 and the mobile units 41, 42, and 43 in accordance with the slot synchronous signal 311.

Figure 5:
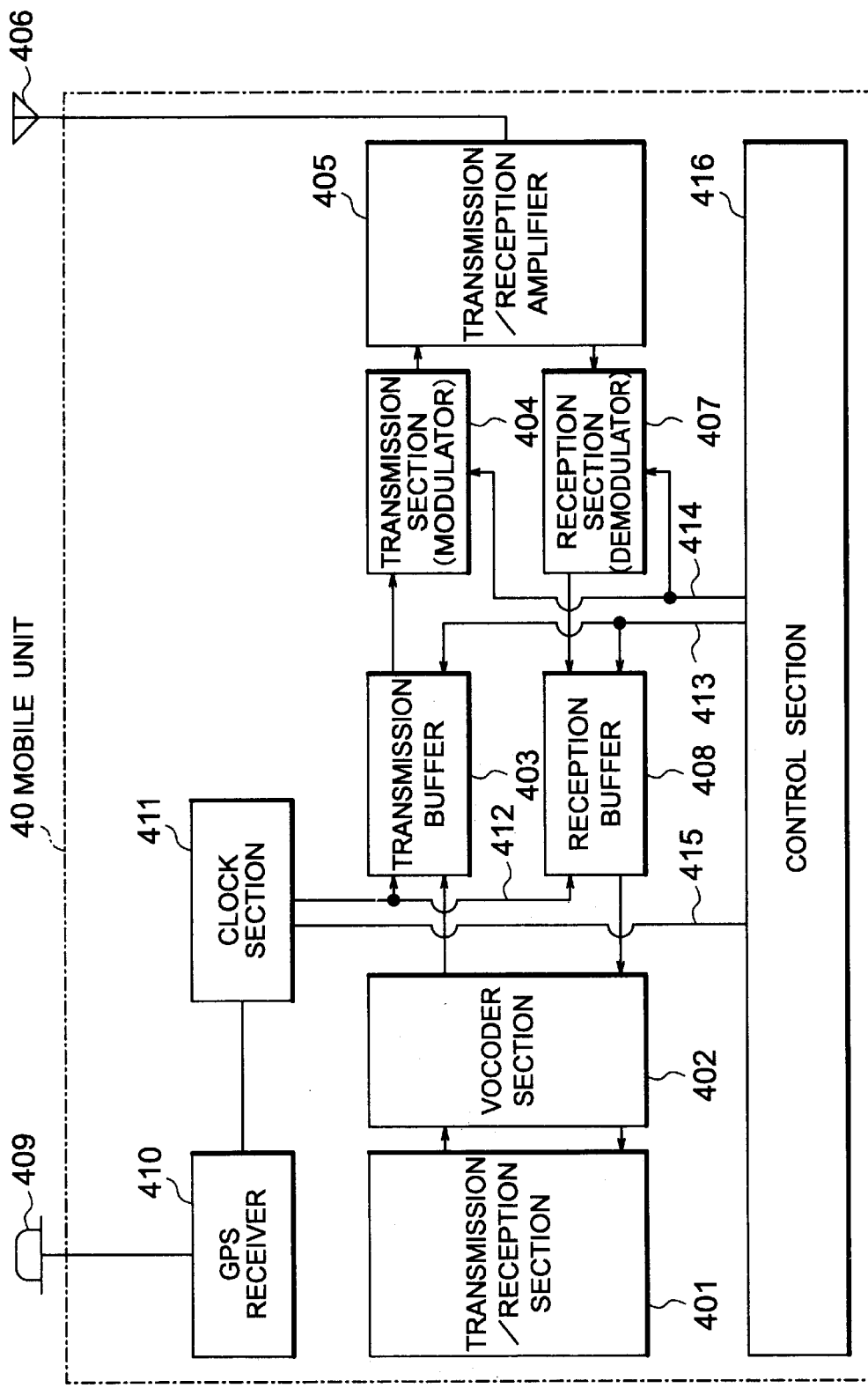
FIG. 5 is a block diagram of a mobile unit for use in the CDMA mobile communication system of FIG. 2.

Referring to FIG. 5 together with FIG. 2, the description will be made as regards the mobile unit 40 (the same as the mobile units 41, 42) included in the CDMA mobile communication system of FIG. 2.

The mobile unit 40 comprises a transmission/reception section 401, a vocoder section 402, a transmission buffer 403, a transmission section 404, a transmission/reception amplifier 405, a communication antenna 406, a reception section 407, a reception buffer 408, a GPS antenna 409, a GPS receiver 410, a clock section 411, control signal conductors 413, 414, 415, and a control section 416.

Voice inputted via the transmission/reception section 401 is coded by the vocoder section 402 and is transmitted to the transmission buffer 403. The transmission buffer 403 assigns the inputted communication data to the time slot for use based on a slot synchronous signal 412 from the clock section 411, and transmits the data to the transmission section 404. Additionally, the time slot number for use is notified to the transmission buffer 403 and the reception buffer 408 via the control signal conductor 413.

The transmission section 404 modulates the inputted communication data with the predetermined frequency and diffusion code, transmits the data to the transmission/reception amplifier 405, and further transmits the data to the base station 30 via the communication antenna 406. Additionally, the frequency and diffusion code to be set are notified to the transmission section 404 and the reception section 407 via the control signal conductor 414.

The reception section 407 demodulates the reception signal received via the communication antenna 406 and the transmission/reception amplifier 405 and transmits the signal to the reception buffer 408. The reception buffer 408 concentrates the reception signals for each corresponding self time slot, and transmits them to the vocoder section 402. The vocoder section 402 decodes and converts the signal to a voice signal to output voice via the transmission/reception section 401. The GPS receiver 410 receives the above-mentioned reference clock signal via the GPS antenna 409, and transmits the clock to the clock section 411. Each of the transmission buffer 403 and the reception buffer 408 is referred to as the synchronizing arrangement.

The clock section 411 receives the control signal 415 from the control section 416 and produces the slot synchronous signal 412 in accordance with the reference clock signal. In other words, the clock section 411 processes the reference clock signal into the slot synchronous signal 412 under control of the control signal 415. Therefore, the clock section 411 is referred to as the clock processing arrangement. The control section 416 is constituted to control the entire mobile unit.

Figure 6A:
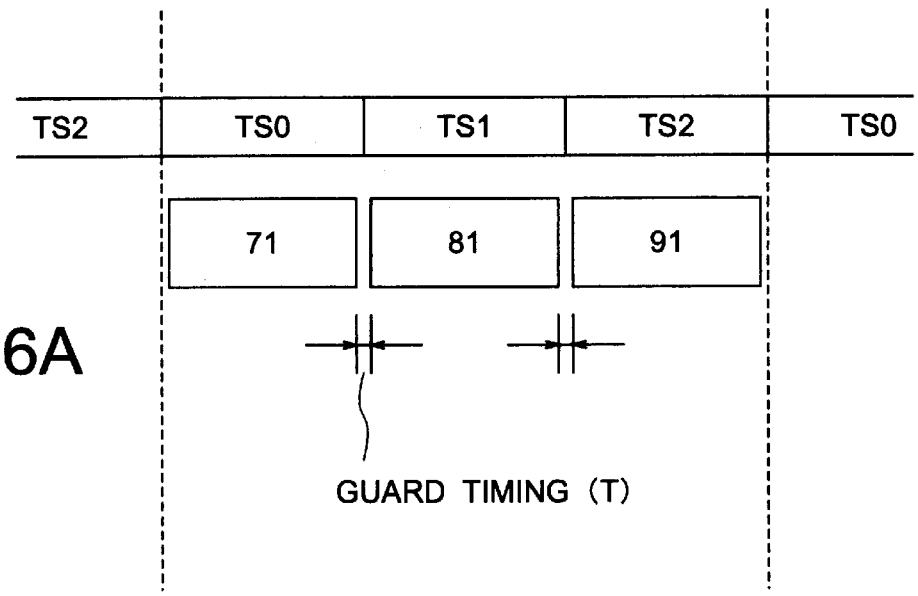
FIG. 6A is an explanatory view showing a guard timing (T) of the time division multiplex signal used in the CDMA mobile communication system of FIG. 2.
Figure 6B:
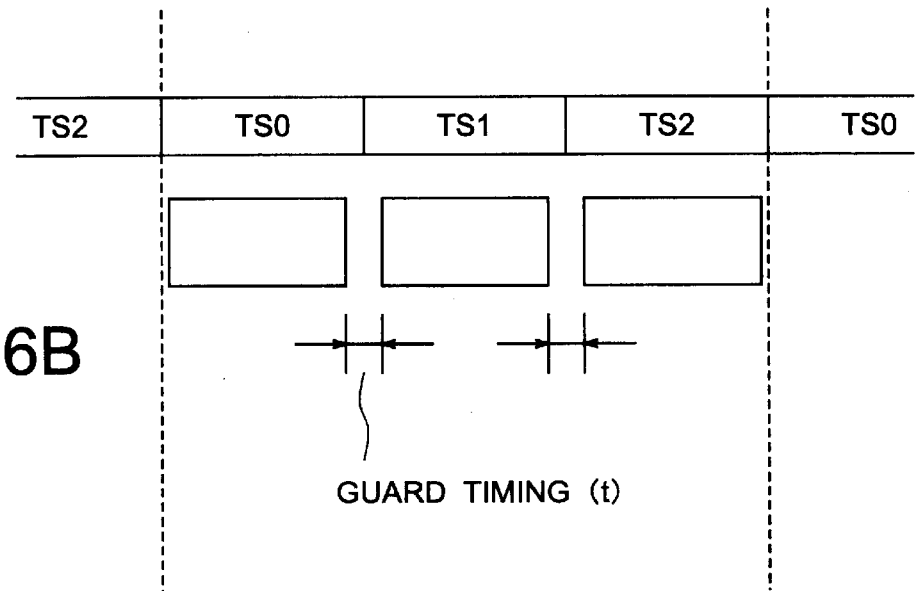
FIG. 6B is an explanatory view showing a guard timing (t) of the time division multiplex signal used in previous technique.

Referring to FIGS. 6A and 6B in addition, the description will be made as regards the effect of the CDMA mobile communication system of FIG. 2.

The base station 30 (35) and the mobile unit 40 (41, 42) are both provided with GPS receivers and are constituted to generate the slot synchronous signals using the reference clock signals obtained from the GPS receivers in the synchronization of the time slots. Therefore, the synchronization of the time slots on the transmission and reception sides can be obtained more accurately. As a result, the guard timing (T) for absorbing the synchronization deviation does not need to be set to be large and can be smaller than the guard timing (t) in the time division multiplex signal in previous technique.

With reference to FIGS. 7, 8 and 9A through 9D, the description will be directed to a CDMA mobile communication system according to a second embodiment of the present invention. Similar parts are designated by like reference numerals.

Figure 7:
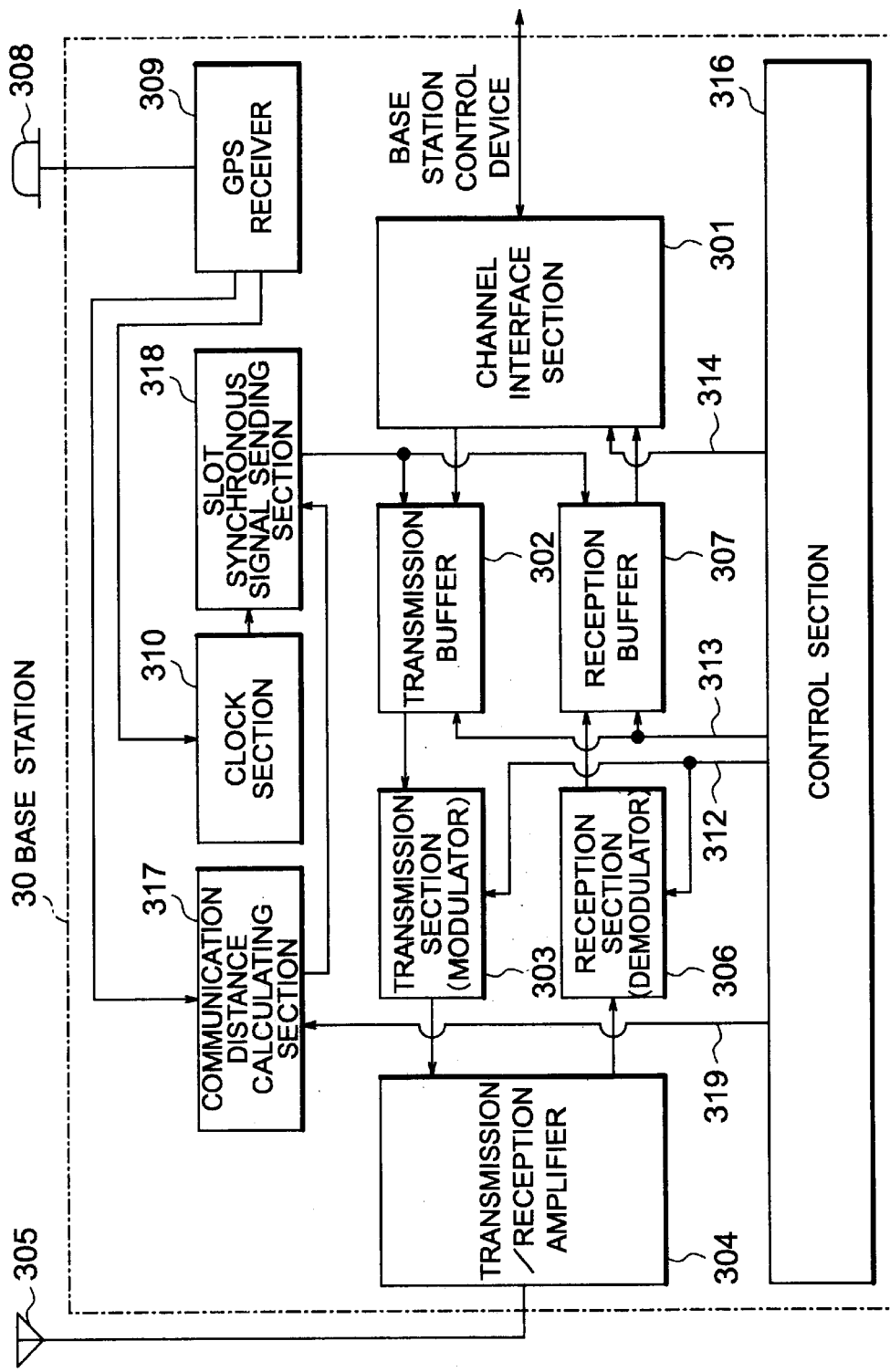
FIG. 7 is a block diagram of a base station for use in the CDMA mobile communication system according to a second embodiment of the present invention.

Referring to FIG. 7 together with FIG. 2, the base station 30 (35) further comprises a communication distance calculating section 317 and a slot synchronous signal sending section 318. The GPS receiver 309 further receives measured position information of the global positioning system. The communication distance calculating section 317 calculates the communication distance to a communication partner mobile unit from the measured position information from the GPS receiver 309 and the position information 319 of the mobile units 40, 41, and 42 sent via the control signals or the communication signals. In other words, the communication distance calculating section 317 processes the measured position information to produce communication distance information representative of the communication distance. Therefore, the communication distance calculating section 317 will be referred to as an information processing arrangement.

This information is transmitted to the slot synchronous signal sending section 318. The slot synchronous signal sending section 318 calculates the delay of reception timing attributed to the communication distance. The synchronization deviation by a distance factor can be absorbed by delaying the slot synchronous signal 311 for reception with this timing. More particularly, the slot synchronous signal sending section 318 delays the slot synchronous signal 311 in accordance with the communication distance information to produce a delayed slot synchronous signal. Therefore, the slot synchronous signal sending section 318 will be referred to as a delaying arrangement.

Specifically, as shown in FIGS. 9A through 9D, for a reception timing shown in FIG. 9B from the mobile unit located in a short distance, synchronization can be obtained at the same timing as the transmission timing shown in FIG. 9A. When the mobile unit is located in a medium or long distance, however, by delaying the timing of the slot synchronous signal 311 sent from the slot synchronous signal sending section 318, the reception timing is delayed as shown in FIGS. 9C or 9D. As a result, the synchronization deviation by the distance factor is absorbed, so that the synchronization of the time slots on the transmission and reception sides can be established more accurately.

Figure 8:
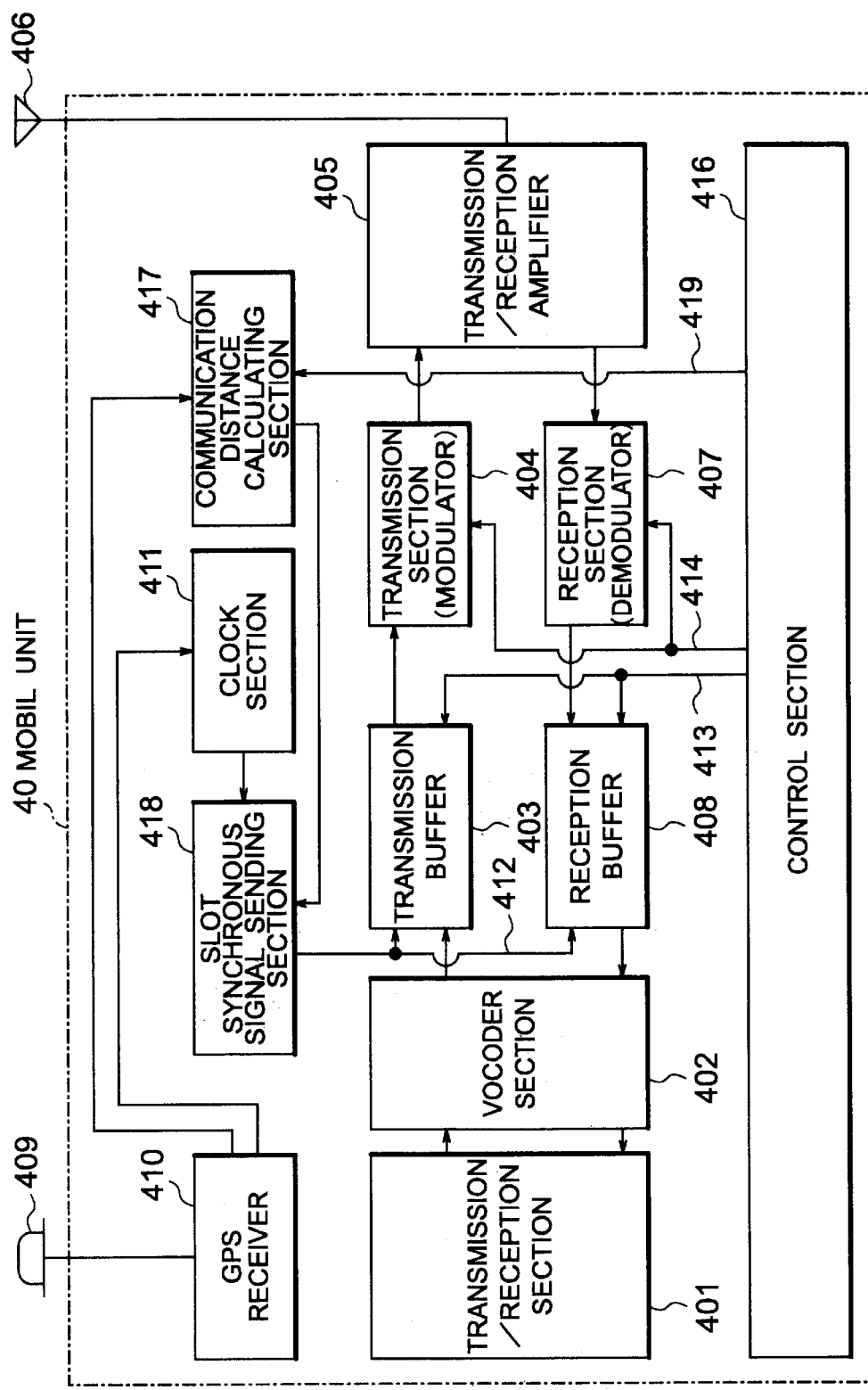
FIG. 8 is a block diagram of a mobile unit for use in the CDMA mobile communication system according to the second embodiment.

Referring to FIG. 8 together with FIG. 2, the mobile unit 40 (41, 42) comprises a communication distance calculating section 417 and a slot synchronous signal sending section 418. Each section operation is the same as that in the above-described base station 30. More particularly, a communication distance calculating section 417 processes the measured position information to produce the communication distance information. Therefore, the communication distance calculating section 317 will be referred to as the information processing arrangement. In addition, a slot synchronous signal sending section 418 delays the slot synchronous signal 412 in accordance with the communication distance information to produce the delayed slot synchronous signal. Therefore, the slot synchronous signal sending section 418 will be referred to as the delaying arrangement.

As described above, in the second embodiment, the reference clock signal obtained from GPS reception signal is used in the synchronization of the time slots of the base station and each mobile unit. Furthermore, the timing signal is used in the slot timing of the reception signal, in which the delay time by the communication distance information based on the measured position information obtained from the GPS reception signal is considered. Therefore, the synchronization of the time slots on the transmission and reception sides can be obtained more accurately in the radio channel multiplex communication method.

Figure 10:
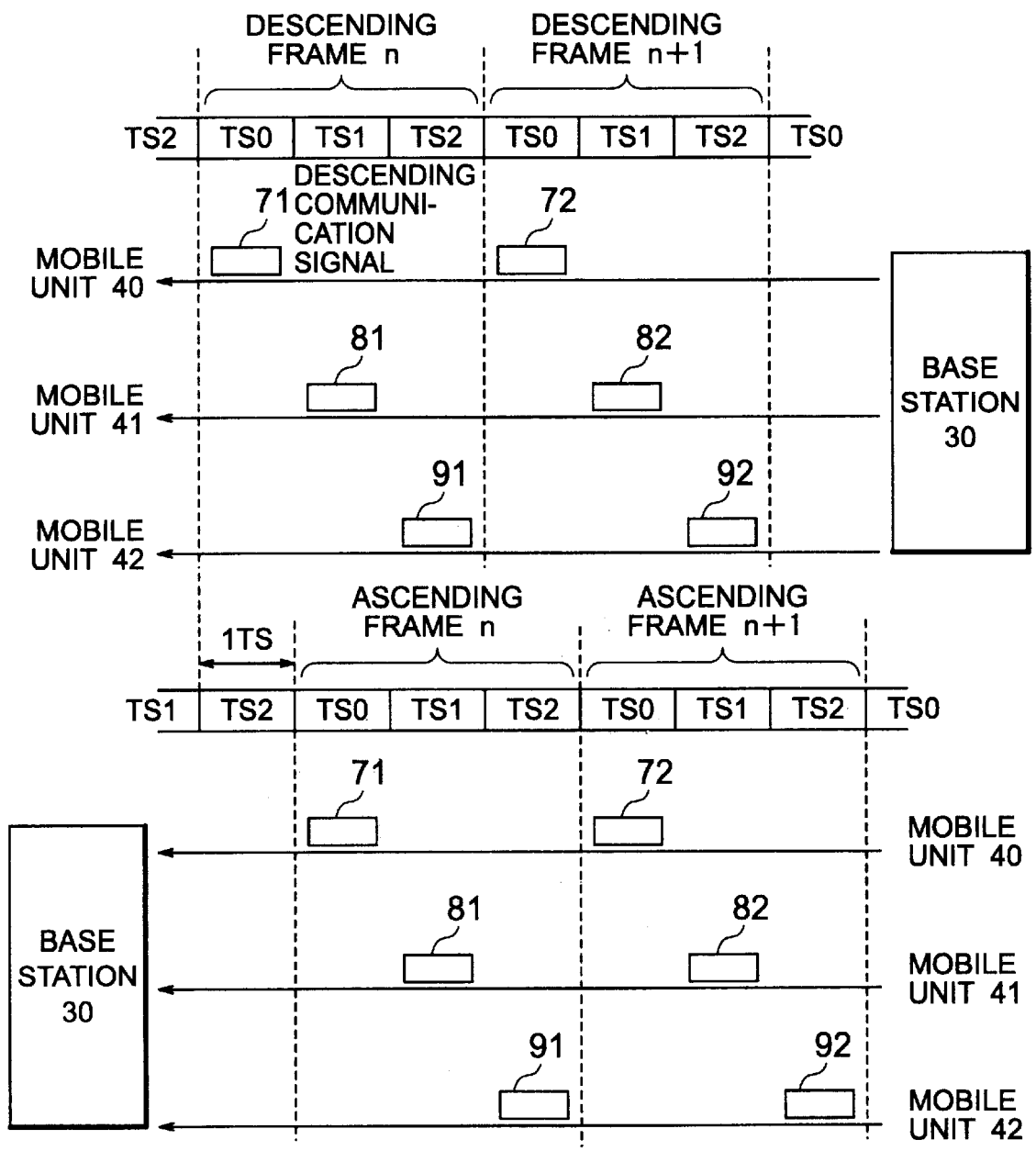
FIG. 10 is an explanatory view for describing the CDMA mobile communication system according to a third embodiment of the present invention.

With reference to FIG. 10, the description will be directed to a CDMA mobile communication system according to a third embodiment of the present invention. Similar parts are designated by like reference numerals.

In the CDMA mobile communication system, the communication frame of descending communication signals deviates from that of ascending communication signals by one time slot, and by preventing the transmission processing and reception processing from being simultaneously performed in one mobile unit, the load of the mobile unit is lightened.

With the CDMA mobile communication system as described above, the frame signal constituted of a plurality of time slots is used in the communication signal, the reference clock signal obtained from the GPS reception signal is used in the synchronization of the time slots of the base station and each mobile unit, and further the reception timing is allowed to deviate in accordance with the communication distance calculated based on the measured position information obtained from the GPS reception signal. In this constitution, the multiplexing of the radio channel performed both in the CDMA and TDMA can be realized with high efficiency and precision while the guard timing is minimized. Therefore, there can be provided a system in which a plurality of radio channels can efficiently be secured in one diffusion code, the resource of the radio channel can be increased without multiplexing the frequency, and a large traffic can be handled without enlarging the equipment. Moreover, in each mobile unit, the reception operation may be performed at the timing of the time slot assigned from the base station control device, the reception operation can be halted at the other timings, and the power consumption can effectively be reduced.

While the present invention has thus far been described in connection with a few embodiments thereof, it will readily be possible for those skilled in the art to put this invention into practice in various other manners. For example, although the time-divided time slots are assigned to the communication channels with the mobile units in the above-mentioned embodiments, they may be assigned to a cellular phone and a portable data terminal device, or to terminals connected to LAN or a party telephone. Moreover, when the slots are assigned to the cellular phone and the portable data terminal device, the lengths of the time slots do not have to be the same, and the time slots different in length may be used. Specifically, the time slots to be assigned to the radio channels may be varied in length.

What is claimed is:

1. A radio channel multiplex communication method for a code division multiple access mobile communication system including a base station and a plurality of mobile units and using a communication signal, modulated and multiplexed with different diffusion codes, in data communication between said base station and each of said mobile units, said radio channel multiplex communication method comprising the steps of:

producing, as said communication signal, a time division multiplex signal with a repeated frame having a plurality of time slots;

assigning said time slots to different radio channels, respectively; obtaining a reference clock signal of a global positioning system;

producing a slot synchronous signal in accordance with said reference clock signal; and synchronizing said time slots between said base station and each of said mobile units in accordance with said slot synchronous signal.

2. A radio channel multiplex communication method as claimed in claim 1, further comprising the steps of:

obtaining measured position information of said global positioning system;

processing said measured position information to produce communication distance information representative of a distance between said base station and each of said mobile units;

delaying said slot synchronous signal in accordance with said communication distance information to produce a delayed slot synchronous signal; and using said delayed slot synchronous signal to synchronize the time slots used in a reception side of said data communication.

3. A radio channel multiplex communication method as claimed in claim 1, wherein said repeated frame has an ascending frame and a descending frame, said radio channel multiplex communication method further comprising the step of deviating said ascending and said descending frames to each other by one of said time slots.

4. A radio channel multiplex communication method as claimed in claim 1, further comprising the step of making said time slots be different from one another in length.

5. A mobile unit for use in a code division multiple access mobile communication system including a base station and using a communication signal, modulated and multiplexed with different diffusion codes, in data communication between said base station and said mobile unit, said communication signal being a time division multiplex signal with a repeated frame having a plurality of time slots which are assigned to different radio channels, respectively, said mobile unit comprising:

a GPS receiver for receiving a reference clock signal of a global positioning system;

clock processing means connected to said GPS receiver for processing said reference clock signal into a slot synchronous signal; and synchronizing means connected to said clock processing means for synchronizing said time slots between said base station and said mobile unit in accordance with said slot synchronous signal.

6. A mobile unit as claimed in claim 5, wherein said GPS receiver further receives measured position information of said global positioning system, said mobile unit further comprising:

information processing means connected to said GPS receiver for processing said measured position information to produce communication distance information representative of a distance between said base station and said mobile unit; and delaying means connected to said information processing means and said synchronizing means for delaying said slot synchronous signal in accordance with said communication distance information to produce a delayed slot synchronous signal, said synchronizing means synchronizing said time slots in accordance with said delayed slot synchronous signal at a reception side of said mobile unit.

7. A base station for use in a code division multiple access mobile communication system including a plurality of mobile units and using a communication signal, modulated and multiplexed with different diffusion codes, in data communication between said base station and each of said mobile units, said communication signal being a time division multiplex signal with a repeated frame having a plurality of time slots which are assigned to different radio channels, respectively, said base station comprising:

a GPS receiver for receiving a reference clock signal of a global positioning system;

clock processing means connected to said GPS receiver for processing said reference clock signal into a slot synchronous signal; and synchronizing means connected to said clock processing means for synchronizing said time slots between each of said mobile units and said base station in accordance with said slot synchronous signal.

8. A base station as claimed in claim 7, wherein said GPS receiver further receives measured position information of said global positioning system, said base station further comprising:

information processing means connected to said OPS receiver for processing said measured position information to produce communication distance information representative of a distance between each of said mobile units and said base station; and delaying means connected to said information processing means and said synchronizing means for delaying said slot synchronous signal in accordance with said communication distance information to produce a delayed slot synchronous signal, said synchronizing means synchronizing said time slots in accordance with said delayed slot synchronous signal at a reception side of said base station.

* * * * *